Jan. 10, 1939.  C. S. GLENNY  2,143,065
BICYCLE BASKET
Original Filed Feb. 17, 1936  2 Sheets-Sheet 1
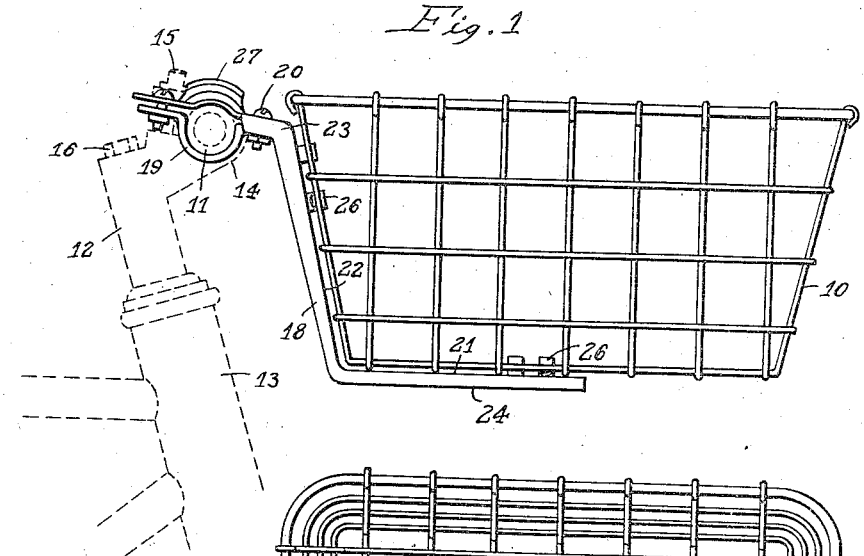
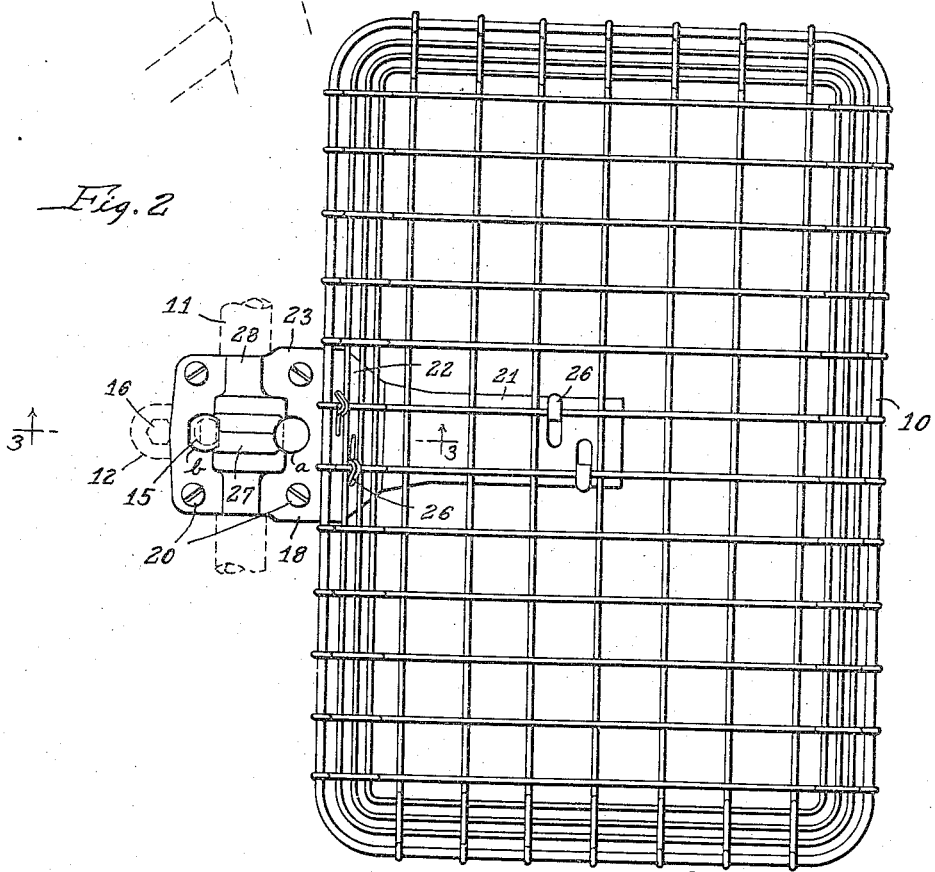
Inventor:
Clarence S. Glenny
By
Wilson, Dowell, McCanna & Wintercorn
Attys.

Jan. 10, 1939.     C. S. GLENNY     2,143,065
BICYCLE BASKET
Original Filed Feb. 17, 1936    2 Sheets-Sheet 2
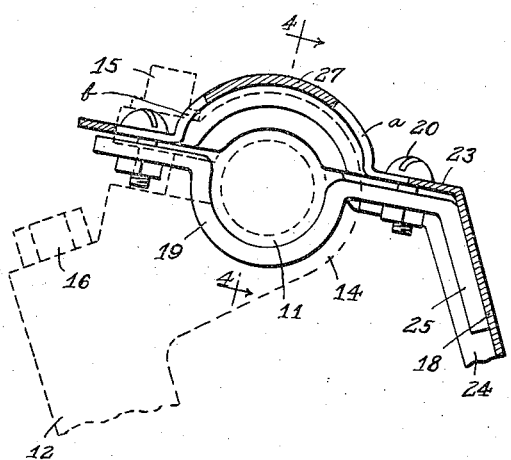
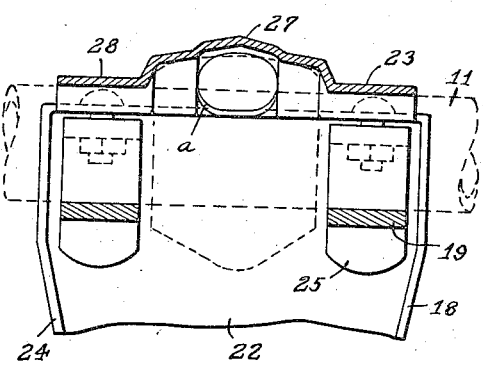
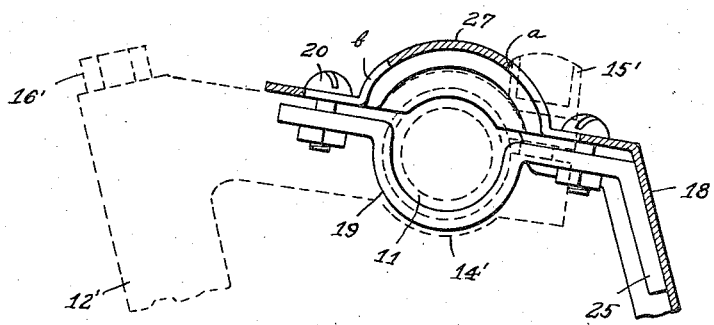
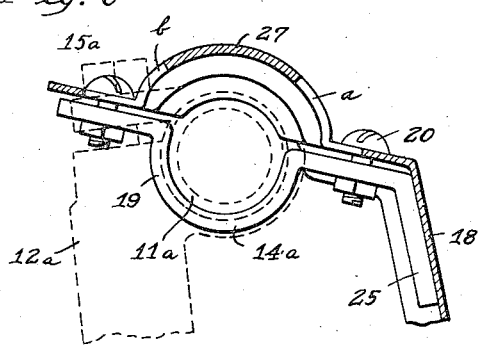
Inventor:
Clarence S. Glenny
By
Wilson, Dowell, McCanna & Wintercorn
Attys.

Patented Jan. 10, 1939

2,143,065

UNITED STATES PATENT OFFICE 2,143,065

BICYCLE BASKET

Clarence S. Glenny, Rockford, Ill., assignor to The Washburn Company, Worcester, Mass., a corporation of Massachusetts Original application February 17, 1936, Serial No. 64,201. Divided and this application April 12, 1937, Serial No. 136,338

7 Claims. (Cl. 224—36)

This invention relates to bicycle baskets.

The principal object of my invention is to provide a bicycle basket in which the supporting and fastening of the basket on the handle-bar is centralized in one bracket member extending from the middle of the basket to the middle of the handle-bar.

In accordance with my invention, the bracket is specially constructed for rigid attachment to the handle-bar directly on opposite sides of the usual clevis through which the handle-bar extends, and provision is made so that the bracket when clamped to the handle-bar will be held by the clevis against turning about the handle-bar as an axis.

An important object of my invention consists in making provisions so that the one form of bracket is adaptable to serve different makes of bicycles regardless of variations in the form of the clevis employed in connection with the handle-bar.

This application is a division of my copending application Serial No. 64,201, filed February 17, 1936, now Pat. No. 2,079,851, issued May 11, 1937.

The invention is illustrated in the accompanying drawings, in which—

Figure 1 is a side view of a bicycle basket embodying my invention shown on the front of a bicycle;

Fig. 2 is a plan view of the basket;

Fig. 3 is a section on the line 3—3 of Fig. 2;

Fig. 4 is a section at right angles to Fig. 3 on the line 4—4 thereof; and

Figs. 5 and 6 are other sections similar to Fig. 3, but showing the application to different styles of clevises on other handle-bar stems.

Similar reference numerals are applied to corresponding parts throughout the views.

Bicycle baskets of the kind illustrated are used for carrying packages, as is well known. Referring first to Figs. 1 to 4, the basket 10 is shown supported on the handle-bar 11 of a bicycle of which the handle-bar stem 12 and head 13 appear in Fig. 1. It is the general practice to provide a clevis on the handle-bar stem in which the handle-bar is clamped by the tightening of a bolt. In Figs. 1 and 3, the clevis is numbered 14 and its bolt 15. The type of stem shown in these figures has another bolt 16 extending lengthwise therein cooperating with an expander nut down in the head 13 to fasten the stem to the front wheel fork in a well known manner. The bolt 15, in the case illustrated in Figs. 1 to 4, is one of the supports for the basket, because it prevents turning of the bracket 18 about the handle-bar 11 as an axis, in a manner which will soon appear. The bracket is clamped to the handle-bar by two straps 19 on opposite sides of the clevis 14, two bolts 20 being provided in connection with each of these straps passing through holes in the bracket and registering holes in the ends of the strap. The bracket 18 is stamped from a single piece of sheet metal to provide a bottom portion 21 fitting under the basket, an upwardly bent intermediate portion 22 fitting behind the basket, and a rearwardly bent top portion 23 for attachment to the handle-bar. The bottom and intermediate portions 21 and 22 and the front end of the top portion 23 are reenforced by longitudinal flanges 24 extending along the opposed lateral edges of the bracket. Thus, even though light sheet metal is employed, the desired strength and rigidity is obtained, and there is no likelihood of the bracket bending out of shape under normal or even slight over-loading of the basket. Additional strength is obtained by having the front ends of the straps 19 extended, as at 25 (Figs. 3 and 4), and bent to fit in the angle formed by the junction of the portions 22 and 23 of the bracket 18. The bracket may be welded or otherwise suitably secured to the basket, depending upon what is best suited to the type of basket construction employed. In the present case where the basket is made of wire, I have illustrated lugs or ears 26 struck from the bottom and intermediate portions 21 and 22 and bent over adjacent wires on the bottom and back of the basket. The top portion 23 of the bracket is formed to provide a central raised portion 27 in which the top portion of the clevis 14 will be accommodated, the bracket spanning said clevis and resting on top of the handle-bar on opposite sides of the clevis. The bracket is also formed on both sides of the portion 27 to provide channels 28 to fit on top of the handle-bar, and, of course, since the straps 19 are below these channels, it follows that the handle-bar will be clamped in the channels when the bolts 20 are tightened.

Attention is now called to the two holes $a$ and $b$ provided in the top portion 23 of the bracket at the front and back of the clevis socket 27. These holes permit attachment of the basket to various makes of bicycles, regardless of the particular style of clevis which happens to be employed in connection with the handle-bar. Thus, in Fig. 5, in which the handle-bar stem 12' is of a type having a bolt 16' for fastening the same to the front fork, the bracket 18 is clamped to the handle-bar 11' by means of the straps 19 and bolts 20 so that the clevis 14' fits in the socket 27 on the top portion of the bracket, and the bracket is held against turning by reason of the projection of the head of the clevis bolt 15' into hole *a*. The hole *a* is, of course, provided at the right location and of the right size to accommodate the head of the bolt 15' with the bracket 18 disposed at the correct angle to support the basket in a horizontal position, or substantially so. It will be observed that the head of the bolt 15' has abutment with the bracket at the rear side of the hole *a* to prevent turning of the bracket about the handle-bar 11' as an axis.

Referring to Fig. 6, in which still another handle-bar stem 12*a* is illustrated, the clevis 14*a* on this style has its bolt 15*a* serving the double purpose of clamping the handle-bar 11*a* and fastening the stem to the front fork in a manner similar to bolts 16 and 16', previously mentioned. In this case the hole *b* accommodates the head of the bolt 15*a*, as shown, and the bracket 18 is clamped to the handle-bar by means of the straps 19 and bolts 20, while the head of the bolt 15*a* serves by engagement with the bracket at the rear side of the hole *b* to prevent turning of the bracket about the handle-bar as as axis.

Referring again to Fig. 3, the clevis 14 of this style of handle-bar stem happens to have its clamping bolt 15 so located that the bracket 18 would not be held at the right angle for horizontal disposition of the basket if the bracket were placed with the head of the bolt 15 abutting the same at the rear side of the hole *a* similarly to Fig. 6. Under these conditions, therefore, the bracket is placed so that a portion of the clevis itself projects into the hole *b* and has abutment at the back thereof, as illustrated.

I have found that the holes *a* and *b*, when made of the proper size and shape and properly spaced with respect to the socket 27 for the handle-bar clevis, will permit attachment of the basket to various makes of bicycles, so long as they have clevis bolts disposed in the different ways illustrated.

In operation, the straps 19 provide adequate and secure fastening for the bracket 18, and since the straps are spaced to the extent illustrated in Fig. 4, the top portion 23 of the bracket being widened sufficiently for that purpose, the bracket is held firmly enough to eliminate sideplay. Inasmuch as the clamps 19 provide a frictional hold on the handle-bar, it follows that the bracket, when supported on the clevis bolt in either of the ways just described, is held in fixed relation to the handle-bar and cannot turn about the handle-bar as an axis. The basket therefore cannot sag under normal loading. The bracket, furthermore, is of channeled or flanged construction, as previously described, to have the requisite strength to eliminate likelihood of bending, even if the basket is at times over-loaded. Further strength to resist bending of the bracket is afforded by the reenforcement derived from the bent extensions 25 of the straps 19, as previously explained. This centralized supporting and fastening bracket 18 is obviously of very simple and economical construction and one which can be put on or taken off the bicycle quickly and easily, and, when the basket is thereby attached to the bicycle it will give satisfactory service indefinitely. There is obviously nothing in the construction described which would tend to cause rattling or squeaking of the basket under the usual service conditions.

It is believed the foregoing description conveys a good understanding of the objects and advantages of my invention. The appended claims have been drawn with a view to covering all legitimate modifications and adaptations.

I claim:

1. A bicycle basket fastening and supporting means comprising the combination with a bicycle handle-bar and a clevis type holder therefor at the middle thereof, said holder having a projecting handle-bar fastener for closing the clevis on the handle-bar, of a single bracket disposed at the middle of the back of a bicycle basket and adapted to support the same on the handle-bar, said bracket having a rearwardly extending attaching portion formed to provide a middle portion projecting upwardly from the plane of two side portions to fit over the top of said holder when the side portions rest on the handle-bar on opposite sides thereof, a pair of clamps extending under the handle-bar on opposite sides of the holder and having means fastening the same to the side portions of the bracket so as to clamp the handle-bar therebetween, and an abutment on the middle portion of the bracket arranged to engage one side of the handle-bar fastener to support said bracket against rotation about said handle-bar as an axis.

2. As an article of manufacture, a sheet metal bracket for supporting a bicycle basket and fastening the same to a bicycle handle-bar of the type having a clamping clevis at its middle with a clamping bolt, the head of which projects for application of a wrench and is adapted to serve as a basket support, said bracket comprising a body portion formed for connection to the basket and to provide a rearwardly extending attaching portion, the latter being of sufficient width to span the handle-bar clevis, said portion also being formed to provide a central socket to accommodate the upper portion of the clevis, and channels extending laterally in opposite directions from said socket to fit on top of the handle-bar on opposite sides of the clevis, a pair of straps under the channeled portions for engagement with the bottom of the handle-bar on opposite sides of the clevis, means for fastening said straps to the bracket whereby frictionally to clamp the handle-bar therebetween, and a plurality of spaced abutments in a median plane on and integral with the bracket, one of which is arranged to engage a projection on the clevis for support of the basket and prevent turning of the bracket about the handle-bar as an axis, the spacing of the abutments being predetermined so as to register one abutment with each of a plurality of differently located projections on a plurality of different styles of clevises.

3. As an article of manufacture, a sheet metal bracket for supporting a bicycle basket and fastening the same to a bicycle handle-bar of the type having a clamping clevis at its middle with a clamping bolt, the head of which projects for application of a wrench and is adapted to serve as a basket support, said bracket comprising a body portion for connection with a basket and having a readwardly extending attaching portion, the latter being of sufficient width to span the handle-bar clevis, said portion also being formed to provide a central socket to fit the top of the clevis, and channels extending laterally in opposite directions from said socket to fit on top of the handle-bar on opposite sides of the clevis, a pair of straps under the channeled portions for engagement with the bottom of the handle-bar on opposite sides of the clevis, means for fastening said straps to the bracket whereby frictionally to clamp a handle-bar therebetween, and an abutment on the bracket to engage the projecting clamping bolt head on the clevis, whereby the bracket when fastened as just described is immovable relative to the clevis and cannot rotate about the handle-bar as an axis.

4. A bracket as set forth in claim 3, wherein said attaching portion is bent in angular relation to the body portion of the bracket, and wherein at least one of the straps has an angular extension fitting in the angle of said bracket to reinforce the bracket at that point.

5. As an article of manufacture, a sheet metal bracket for supporting a bicycle basket and fastening the same to a bicycle handle-bar of the type having a clamping clevis at its middle portion with a clamping bolt thereon the head of which projects for application of a wrench and is adapted to support a bicycle basket, said bracket comprising a main body portion for connection with the basket and a rearwardly extending attaching portion for mounting on the handle-bar, said attaching portion being of sufficient width to span the handle-bar clevis and being formed to provide a central socket to receive the clevis, and channels extending laterally in opposite directions from the socket to fit over the handle-bar on opposite sides of the clevis, said bracket having two holes provided therein in fore and aft spaced relationship in front of and behind the socket each of a size and shape and so located with relation to the socket as to register with and receive therein the head of the bolt on the related one of a plurality of different handle-bar clevises which has the bolt correspondingly located with relation to the clevis so as to register with the hole adapted to receive it.

6. As an article of manufacture, a sheet metal bracket for supporting a bicycle basket and fastening the same to a bicycle handle-bar of the type having a clamping clevis at its middle portion with a clamping bolt thereon the head of which projects for application of a wrench and is adapted to support a bicycle basket, said bracket comprising a main body portion for connection with the basket and a rearwardly extending attaching portion for mounting on the handle-bar, said attaching portion being of sufficient width to span the handle-bar clevis and being formed to provide a central socket to receive the clevis, and channels extending laterally in opposite directions from the socket to fit over the handle-bar on opposite sides of the clevis, said bracket having a hole provided therein in spaced relation to the socket and behind the same, the hole being of such size and shape and so located with relation to the socket that it is adapted to register with and receive the head of the bolt on the handle-bar clevis.

7. A structure as set forth in claim 1, wherein the bracket is of sheet metal and has the attaching portion thereof bent in angular relation to the rest of the bracket, and wherein at least one of the clamps extending under the handle-bar has an angular extension fitting in the angle of the bracket to reenforce the latter.

CLARENCE S. GLENNY.